United States Patent [19]

Leggett et al.

[11] Patent Number: 4,846,978
[45] Date of Patent: Jul. 11, 1989

[54] RECOVERY OF METALS FROM SOLUTIONS CONTAINING CHELANTS

[75] Inventors: David J. Leggett; Joel G. Courtwright, both of Angleton, Tex.

[73] Assignee: The Dow Chemical Company, Midland, Mich.

[21] Appl. No.: 272,190

[22] Filed: Nov. 16, 1988

[51] Int. Cl.$^4$ .............................. C02F 1/64; C02F 1/78
[52] U.S. Cl. ..................................... 210/748; 210/760; 210/912; 210/913
[58] Field of Search ............... 210/721, 748, 760, 908, 210/909, 912–914; 423/42, 43, 55, 104, 140, 164

[56] References Cited

U.S. PATENT DOCUMENTS

| | | | |
|---|---|---|---|
| 3,767,572 | 10/1973 | Bober et al. | 210/756 X |
| 3,920,547 | 11/1975 | Garrison et al. | 210/748 |
| 4,012,321 | 3/1977 | Koubek | 210/748 |
| 4,289,594 | 9/1981 | Alpaugh et al. | 210/748 |
| 4,332,687 | 6/1982 | Daignault et al. | 210/721 |
| 4,419,246 | 12/1983 | Jayawant | 210/721 |
| 4,512,900 | 4/1985 | Macur et al. | 210/748 |
| 4,642,134 | 2/1987 | Van Antwerp et al. | 210/760 X |

OTHER PUBLICATIONS

J. Chem. Eng. Japan vol. 19, pp. 294–299 (1986) "Ozonation Rate of Water-Soluble Chelates and Related Compounds".
J. Chem. Eng. Japan, vol. 12, pp. 111–117 (1979) "Single and Simultaneous Absorptions of Lean $SO_2$ and $NO_2$ into Aqueous Slurries of $Ca(OH)_2$ and $Mg(OH)_2$".
Journal of Water Pollution Control Federation, vol. 47, pp. 2114–2129 (1975) "Ozonation of Photographic Processing Wastes".
Anal. Chem., vol. 50, p. 50 (1978) "Ozone Oxidation of Organic Sequestering Agents in Water Prior to the Determination of Trade Metals by Anodic Stripping Voltammetry".
Environ. Health Persp., vol. 69, p. 31 (1986) "Occurrence of By-Products of Strong Oxidants Reacting with Drinking Water Contaminants—Scope of the Problem".
Ozone: Science & Engin., vol. 1, p. 133 (1979) "Ozonation of Hanford Nuclear Defense Waste".
Journal of Water Pollution Control, vol. 51, p. 113 (1978) "Removal of Heavy Metals via Ozonation".

*Primary Examiner*—Tom Wyse

[57] ABSTRACT

Metal chelates in solution are decomposed more effectively and completely by ozonation when magnesium hydroxide is added to the chelate solution prior to ozonation. The process is particularly applicable to waste streams from which it is desired to recover metals to avoid contamination of the environment and/or reuse them.

11 Claims, No Drawings

RECOVERY OF METALS FROM SOLUTIONS CONTAINING CHELANTS

BACKGROUND OF THE INVENTION

Metals in aqueous solutions are difficult to recover when these solutions also contain chelating agents which have a high affinity for the metal, thus, keeping it in solution and preventing its precipitation. It is necessary, therefore, to find some means of decomposing the chelates (complexes), thereby separating the metal ions from the chelant moiety. One such method involves ozonation in combination with ultraviolet light. This is found in U.S. Pat. Nos. 4,289,594 and 4,512,900 which describe methods for treating liquid wastes containing copper ions and complexing agents therefor. The process steps of the latter patent include reducing the copper ions to a concentration of less than 8 ppm, treating with $H_2O_2$ followed by ozonation with simultaneous irradiation with ultraviolet light. Another method using ozone and hydrogen peroxide to treat photographic wastes is disclosed in U.S. Pat. No. 4,332,687.

Another literature reference, "Ozonation Rate of Water-soluble Chelates and Related Compounds", J. Chem. Eng. Japan 19, 294 (1986) describes the rates of ozonation for various chelates including Cu, Zn, Ni and Co chelates of ethylenediaminetetraacetic acid.

SUMMARY OF THE INVENTION

Metal chelates in waste streams are decomposed by ozonation so that one may precipitate and recover the metal, or otherwise adequately dispose of it. The present invention is an improvement in the process which destroys the metal chelate by ozonation. The addition of magnesium hydroxide to the solution containing the metal chelates prior to ozonation permits more effective decomposition of the chelates and at a faster rate in order that the metal may be removed from solution.

DETAILED DESCRIPTION OF THE INVENTION

Certain metals, such as copper, iron, zinc, silver, barium, cadmium, chromium and lead, are very undesirable in waste streams from an environmental standpoint. Ultimate removal of these metals is made more difficult when chelant molecules are present in the stream and inhibit the precipitation of the metals. The present invention is an improvement on a known process which involves ozonation of the waste stream to destroy the metal chelates, thus permitting the precipitation of the metal.

The improvement involves the addition of magnesium hydroxide to the stream prior to ozonation. The magnesium hydroxide can be added either as a slurry or prepared in situ by adding a salt of magnesium, e.g. $MgCl_2$, followed by adjusting the pH to about 9.5 with a base such as NaOH. The presence of magnesium hydroxide is believed to aid in the absorption of ozone and thus tends to speed the degradation process. Since hydroxide ions are present, the precipitation of metal ions will also occur in situ.

The amount of magnesium hydroxide or magnesium chloride added to the stream will depend upon the quantity of metals to be precipitated. Generally, an amount of from about 0.5 to about 5.0 moles of magnesium hydroxide (or chloride) per mole of metal to be precipitated is operable. A preferred amount is from about 2 to about 3 moles per mole of metal. As a source of hydroxide ions magnesium hydroxide is preferred to other metal hydroxides such as sodium hydroxide. Too much sodium hydroxide may, for example, cause an undesirably high pH, i.e. greater than about 12, whereas a saturated magnesium hydroxide solution can only raise the pH to a value of about 10.5.

The initial pH of waste streams to be treated may vary within the range of from about 3 to about 12. The pH, however, after the addition of the $Mg(OH)_2$ and the start of ozonation, quickly reaches a level of between about 8 and 9.

Ozone is supplied to the solution in any convenient manner, e.g. through a sparging device which is inserted below the surface of the solution. The ozone-containing gas employed should contain ozone in an amount of from about 15 to about 50 mg $O_3$/L* of gas. The preferred concentration of ozone is at least about 25 mg $O_3$/L. Ozone is introduced into the solution in amounts sufficient to decompose the metal chelate. The rate of $O_3$ introduction into the solution will depend to some extent upon the concentration of the ozone in the gas, but generally should be at least about 200 g/hr/kg of active chelant, preferably from about 300 to about 600 g/hr/kg. The upper limit of this rate will depend upon the ozonator employed, but the rate should not be so great that much of the ozone will pass through the solution without having the desired effect.

* Based on a standard liter, i.e. volume at STP

The ozonation is generally conducted at ambient conditions. Temperatures of the solution to be treated should be in the range of from about 5° to about 40°. Lower temperaturers slow the reaction unduly while temperatures higher than 40° C. decompose the ozone before it can decompose the metal chelate. Atmospheric pressure is employed, but apparently no advantage is provided by pressures greater than atmospheric.

Metals occurring in waste streams which may be complexed and which it is desired to remove include transition metals, metals from Groups IVB and VB of the periodic chart** and some alkaline earth metals. Some of these are copper, chromium, tungsten, iron, cobalt, nickel, barium, bismuth, lead, tin, manganese and zinc.

** The chart is found in *Fundamental Chemistry*, 2nd Edition, by H. G. Deming, John Wiley & Sons, Inc., (19—)

The process of the invention decomposes the metal chelates of a number of chelants or complexing agents. Included are chelants such as nitrilotriacetic acid and iminodiacetic acid; the alkylenepolyaminopolycarboxylic acids such as the alkylenediaminepolycarboxylic acids, e.g. ethylenediaminetetraacetic acid, hydroxyethylethylenediaminetriacetic acid and propylenediaminetetraacetic acid; diethylentriaminepentaacetic acid; triethylenetetraminehexaacetic acid and the like. Other chelants include diethylenetriamine and citric acid. The acid chelating agents can also be used in the form of their salts, e.g. Na, K or $NH_4$.

The use of ultraviolet radiation along with the ozonation step, as is known to the art, can also be employed with the present invention.

The following examples illustrate and are representative of the invention. The ozone generator employed in these experiments was an OREC Model $O_3V_5$, manufactured by the Ozone Research & Equipment Corporation, Phoenix, Ariz.

EXAMPLE 1

A one liter aqueous solution was made containing the indicated quantities in parts per million of the following metals complexed with ethylenediaminetetraacetic acid (EDTA), added as 30.4 g/L of the tetrasodium salt: copper (Cu, 700), chromium (cr, 500), iron (Fe, 500), nickel (Ni, 500) zinc (Zn, 540) and barium (Ba, 500). The nitrate salt of each of the above metals was used to obtain the chelate. The initial pH of the solution was 8.5. This solution was divided into two equal parts and to one part 4 g of a 50% aqueous slurry of $Mg(OH)_2$ was added. To the other was added sufficient NaOH to maintain the pH at about 8.5 during the course of the experiment. The two equal parts of the solution were exposed to ozone (by sparging it through a tube inserted below the surface of the solution to near the bottom of the container) in order to decompose the metal chelates (complexes) and precipitate the metal as its hydroxide. The ozone-containing gas had a concentration of 30 mg $O_3$/L of gas. The ozonation was conducted over a period of six hours at a rate of 0.1 g/min of $O_3$ (350 g/hr/kg) of chelant. The amount of metal remaining in solution as the chelate was determined at intervals by inductively coupled plasma (ICP) spectroscopic analysis. The amount of metal precipitated was then determined by difference. The results of the experiment are shown in Table I.

TABLE I

| Metal | Concn. (ppm) | Percent Precipitated (after 90 min. ozonation) | | Percent Precipitated (after 210 min. ozonation) | |
|---|---|---|---|---|---|
| | | without $Mg(OH)_2$ | with $Mg(OH)_2$ | without $Mg(OH)_2$ | with $Mg(OH)_2$ |
| Ba | 500 | 27 | 35 | 45 | 70 |
| Cr | 500 | 20 | 35 | 50 | 65 |
| Cu | 700 | 0 | 5 | 3 | 15 |
| Fe | 500 | 0 | 85 | 25 | 100 |
| Ni | 500 | 0 | 5 | 5 | 10 |
| Zn | 540 | 0 | 5 | 5 | 45 |

While the process of the invention in the above experiment apparently did not decompose the particular copper and zinc chelates as well as it did several of the other metal chelates, repeated and/or prolonged treatment will accomplish the desired result. There is, however, a substantial improvement shown for the process of the invention over the ozonation conducted in the absence of $Mg(OH)_2$.

EXAMPLE 2

An aqueous solution (500 mL) was made containing the indicated quantities in parts per million of the following metals complexed with ethylenediamine-tetraacetic acid (EDTA), added as 30.4g/L of the tetrasodium salt: copper (Cu, 700), iron (Fe, 500), nickel (Ni, 500) and zinc (Zn, 540). The nitrate salt of each of the above metals was used to obtain the chelate. To this solution was added 3.2 g $MgCl_2$ (equivalent to 4 g of a 50% aqueous slurry of $Mg(OH)_2$) and then sufficient NaOH was added to adjust the pH to 9.5. Ozonation was performed in the manner of Example 1 above. Results are shown in Table II.

TABLE II

| Metal | Concn. (ppm) | Percent Precipitated (after 90 min. ozonation) | |
|---|---|---|---|
| | | without $Mg(OH)_2$ | with $Mg(OH)_2$ |
| Cu | 700 | 20 | 40 |
| Fe | 500 | 100 | 100 |
| Ni | 500 | 15 | 20 |
| Zn | 540 | 40 | 85 |

While it might be expected that calcium hydroxide might also be effective as an equivalent for $Mg(OH)_2$, experiments using calcium hydroxide in place of $Mg(OH)_2$ have shown that such is not the case.

We claim:

1. In a process for decomposing metal chelates in an aqueous solution by ozonation in order to precipitate the metal therein, the improvement which comprises (a) adding magnesium hydroxide to said solution in an amount sufficient to increase the rate and/or quantity of metal precipitated upon subsequent ozonation and (b) contacting said solution containing magnesium hydroxide with ozone to decompose said metal chelates.

2. The process of claim 1 wherein the amount of magnesium hydroxide added to the solution is from about 0.5 to 5.0 moles per mole of total metals present in the stream.

3. The process of claim 2 wherein the magnesium hydroxide added is from about 2 to about 3 moles per mole of total metals present in the stream.

4. The process of claim 1 wherein the temperature of the solution in step (b) is from about 5° to about 40° C.

5. The process of claim 1 wherein the ozonation of step (b) is conducted at ambient temperature.

6. The process of claim 1 wherein the metal chelates therein have been formed from metal ions and a chelant selected from the group consisting of nitrilotriacetic acid, iminodiacetic acid, alkylenepolyaminopolycarboxylic acids, citric acid and mixtures thereof.

7. The process of claim 6 wherein the alkylenepolyaminopolycarboxylic acid is an ethylenepolyaminopolycarboxylic acid.

8. The process of claim 7 wherein the ethylenepolyaminopolycarboxylic acid is ethylenediaminetetraacetic acid.

9. The process of claim 5 wherein the aqueous solution contains a mixture of metal chelates formed from at least one metal in ionic form and a mixture of chelants as complexing agents for the metal.

10. The process of claim 9 wherein the metal chelates are chelates of metals selected from the group consisting of copper, chromium, iron, zinc, barium and mixtures thereof.

11. The process of claim 1 wherein ultraviolet light is employed in the ozonation step.

* * * * *